United States Patent
Esna Ashari Esfahani et al.

(10) Patent No.: US 12,365,335 B2
(45) Date of Patent: Jul. 22, 2025

(54) DETECTION OF DISTRACTED DRIVERS

(71) Applicant: GM Global Technology Operations LLC, Detroit, MI (US)

(72) Inventors: Alireza Esna Ashari Esfahani, Novi, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 18/055,116

(22) Filed: Nov. 14, 2022

(65) Prior Publication Data

US 2024/0157935 A1 May 16, 2024

(51) Int. Cl.
*B60W 30/095* (2012.01)
*B60W 50/14* (2020.01)
(Continued)

(52) U.S. Cl.
CPC ........ *B60W 30/0956* (2013.01); *B60W 50/14* (2013.01); *G01S 19/13* (2013.01); *G06V 10/764* (2022.01); *G06V 20/58* (2022.01); B60W 2050/146 (2013.01); B60W 2554/4041 (2020.02); B60W 2554/4042 (2020.02); B60W 2554/4044 (2020.02);
(Continued)

(58) Field of Classification Search
CPC ............ B60W 30/0956; B60W 50/14; B60W 2050/146; B60W 2554/4041; B60W 2554/4042; B60W 2554/4044; B60W 2554/4046; B60W 2554/4049; B60W 2555/60; B60W 2050/143; B60W 2552/05; B60W 2552/53; B60W 2554/402; B60W 2554/4047; B60W 2554/406; B60W 2555/20; B60W 2756/10; G01S 19/13; G06V 10/764; G06V 20/58; G06V 2201/08; G06V 20/582; G06V 20/588

See application file for complete search history.

(56) References Cited

U.S. PATENT DOCUMENTS

2017/0243504 A1* 8/2017 Hada .................. G06N 5/04
2018/0257647 A1* 9/2018 Jurca .................. G01S 13/931
(Continued)

OTHER PUBLICATIONS

United States Patent and Trademark Office. U.S. Appl. No. 17/820,317, filed Aug. 17, 2022.

*Primary Examiner* — Faris S Almatrahi
*Assistant Examiner* — Moises Gasca Alva
(74) *Attorney, Agent, or Firm* — Vivacqua Crane, PLLC

(57) ABSTRACT

A system for detecting hazards for a vehicle includes a vehicle sensor for determining information about an environment surrounding the vehicle and a global navigation satellite system (GNSS). The system also includes a controller in electrical communication with the vehicle sensor and the GNSS. The controller is programmed to perform a plurality of measurements. The controller is further programmed to determine a plurality of classification scores of the first remote vehicle based at least in part on the plurality of measurements of the first remote vehicle and to determine an overall hazard score of the first remote vehicle based at least in part on the plurality of classification scores of the first remote vehicle. The controller is further programmed to take an action based at least in part on the overall hazard score of the first remote vehicle.

20 Claims, 2 Drawing Sheets

(51) Int. Cl.
  *G01S 19/13* (2010.01)
  *G06V 10/764* (2022.01)
  *G06V 20/58* (2022.01)

(52) U.S. Cl.
  CPC .............. *B60W 2554/4046* (2020.02); *B60W 2554/4049* (2020.02); *B60W 2555/60* (2020.02); *G06V 2201/08* (2022.01)

(56) References Cited

U.S. PATENT DOCUMENTS

| | | | |
|---|---|---|---|
| 2019/0009785 A1* | 1/2019 | Lawrenson | G08G 1/166 |
| 2019/0155290 A1* | 5/2019 | Luo | G05D 1/0274 |
| 2019/0337451 A1* | 11/2019 | Bacchus | B60K 35/28 |
| 2020/0008028 A1* | 1/2020 | Yang | G08G 1/0175 |
| 2021/0097302 A1* | 4/2021 | Butcher | G06F 18/24 |
| 2021/0272462 A1* | 9/2021 | Yang | G05D 1/0289 |
| 2022/0327932 A1* | 10/2022 | Nakaya | G08G 1/0133 |
| 2022/0355802 A1* | 11/2022 | Chaves | B60W 40/09 |
| 2024/0124008 A1* | 4/2024 | Ucar | B60W 50/14 |

\* cited by examiner

DETECTION OF DISTRACTED DRIVERS

INTRODUCTION

The present disclosure relates to systems and methods for detection of hazardous vehicles.

To increase safety of vehicle occupants, vehicles may be equipped with collision avoidance systems (CAS). Collision avoidance systems are generally designed to prevent and/or reduce the severity of vehicular collisions. Collision avoidance systems may use sensors to gather data about an object (e.g., a remote vehicle, pedestrian, and/or structure) in the environment surrounding the vehicle which may cause a collision. Using the data gathered about the object in the environment and data about the vehicle (e.g., speed, acceleration, and/or steering angle), the collision avoidance system may determine whether a collision is possible and take action to mitigate a collision. However, current collision avoidance systems may fail to detect collision risk caused by unexpected driver actions, erratic driving behaviors, and/or damaged vehicle components.

Thus, while current collision avoidance systems achieve their intended purpose, there is a need for a new and improved system and method for detection of hazardous vehicles.

SUMMARY

According to several aspects, a system for detecting hazards for a vehicle is provided. The system includes a vehicle sensor for determining information about an environment surrounding the vehicle and a global navigation satellite system (GNSS) for determining a geographical location, heading, and orientation of the vehicle. The system also includes a controller in electrical communication with the vehicle sensor and the GNSS. The controller is programmed to perform a plurality of measurements of a first remote vehicle using the vehicle sensor to determine a position, heading, and velocity of the first remote vehicle. The controller is further programmed to determine a plurality of classification scores of the first remote vehicle based at least in part on the plurality of measurements of the first remote vehicle. The controller is further programmed to determine an overall hazard score of the first remote vehicle based at least in part on the plurality of classification scores of the first remote vehicle. The controller is further programmed to take an action based at least in part on the overall hazard score of the first remote vehicle.

In another aspect of the present disclosure, to determine the plurality of classification scores of the first remote vehicle, the controller is further programmed to determine an acceptable speed range of the first remote vehicle. To determine the plurality of classification scores of the first remote vehicle, the controller is further programmed to determine a speeding classification score of the first remote vehicle based at least in part on the plurality of measurements of the first remote vehicle. To determine the speeding classification score, the controller is further programmed to compare a velocity of the first remote vehicle to the acceptable speed range of the first remote vehicle. To determine the plurality of classification scores of the first remote vehicle, the controller is further programmed to determine a plurality of position and speed violation classification scores of the first remote vehicle. To determine the plurality of classification scores of the first remote vehicle, the controller is further programmed to determine a plurality of mutual interaction violation classification scores of the first remote vehicle. To determine the plurality of classification scores of the first remote vehicle, the controller is further programmed to determine an anomaly detection score of the first remote vehicle. To determine the plurality of classification scores of the first remote vehicle, the controller is further programmed to determine a plurality of traffic rule violation classification scores of the first remote vehicle. To determine the plurality of classification scores of the first remote vehicle, the controller is further programmed to determine a plurality of visual hazard classification scores of the first remote vehicle.

In another aspect of the present disclosure, to determine the acceptable speed range of the first remote vehicle, the controller is further programmed to determine a plurality of road characteristics of a roadway upon which the first remote vehicle is traveling using at least one of the vehicle sensor and the GNSS. The plurality of road characteristics includes at least one of a road type, an effective road width, and a road speed limit. To determine the acceptable speed range of the first remote vehicle, the controller is further programmed to determine a plurality of road conditions of the roadway upon which the first remote vehicle is traveling using at least one of the vehicle sensor and the GNSS. The plurality of road conditions includes at least one of a road weather condition, a road moisture condition, and a road lighting condition. To determine the acceptable speed range of the first remote vehicle, the controller is further programmed to determine a plurality of road hazard statuses of the roadway upon which the first remote vehicle is traveling using the vehicle sensor, where the plurality of road hazard statuses includes at least one of a pedestrian presence status, a bicyclist presence status, and a congestion hazard status. To determine the acceptable speed range of the first remote vehicle, the controller is further programmed to calculate the acceptable speed range of the first remote vehicle using a machine learning regression model, where the machine learning regression model has been trained to output the acceptable speed range of the first remote vehicle based on the plurality of road characteristics, the plurality of road conditions, and the plurality of road hazard statuses of the roadway upon which the first remote vehicle is traveling.

In another aspect of the present disclosure, to determine the plurality of position and speed violation classification scores of the first remote vehicle, the controller is further programmed to retrieve a location of lane edges of a roadway upon which the first remote vehicle is traveling using at least one of: the GNSS and the vehicle sensor. To determine the plurality of position and speed violation classification scores of the first remote vehicle, the controller is further programmed to determine the plurality of position and speed violation classification scores of the first remote vehicle using a machine learning classifier model. The plurality of position and speed violation classification scores includes a lane keeping failure classification score, an excessive turn speed classification score, and an excessive speed change classification score. The machine learning classifier model has been trained to output the plurality of position and speed violation classification scores based on the plurality of measurements of the first remote vehicle and the location of lane edges.

In another aspect of the present disclosure, to determine the plurality of mutual interaction violation classification scores of the first remote vehicle, the controller is further programmed to determine a distance between the first remote vehicle and a second remote vehicle using the vehicle sensor. To determine the plurality of mutual interaction violation classification scores of the first remote vehicle, the controller is further programmed to compare the distance between the first remote vehicle and the second remote vehicle to a predetermined distance threshold. To determine the plurality of mutual interaction violation classification scores of the first remote vehicle, the controller is further programmed to perform a plurality of measurements of the second remote vehicle using the vehicle sensor to determine a position, heading, and velocity of a second remote vehicle in response to determining that the distance between the first remote vehicle and the second remote vehicle is less than or equal to the predetermined distance threshold. To determine the plurality of mutual interaction violation classification scores of the first remote vehicle, the controller is further programmed to determine the plurality of mutual interaction violation classification scores of the first remote vehicle using a machine learning classifier model. The plurality of mutual interaction violation classification scores includes a tailgating classification score, a dangerous passing classification score, and a road rage classification score. The machine learning classifier model has been trained to output the plurality of mutual interaction violation classification scores based on the plurality of measurements of the first remote vehicle and the plurality of measurements of the second remote vehicle.

In another aspect of the present disclosure, to determine the anomaly detection score of the first remote vehicle, the controller is further programmed to determine the anomaly detection score of the first remote vehicle using a machine learning anomaly detection model. The machine learning anomaly detection model has been trained to detect anomalies based on at least one of the plurality of measurements of the first remote vehicle and geographic data from the GNSS.

In another aspect of the present disclosure, to determine the plurality of traffic rule violation classification scores of the first remote vehicle, the controller is further programmed to retrieve information about road signs in an environment surrounding the first remote vehicle using at least one of the GNSS and the vehicle sensor. To determine the plurality of traffic rule violation classification scores of the first remote vehicle, the controller is further programmed to retrieve information about traffic signals in the environment surrounding the first remote vehicle using at least one of the GNSS and the vehicle sensor. To determine the plurality of traffic rule violation classification scores of the first remote vehicle, the controller is further programmed to determine a right-of-way status of the first remote vehicle, where the right-of-way status includes a right-of-way violation status and a right-of-way non-violation status. To determine the plurality of traffic rule violation classification scores of the first remote vehicle, the controller is further programmed to determine the plurality of traffic rule violation classification scores of the first remote vehicle using a machine learning classifier model, where the plurality of traffic rule violation classification scores includes a road sign violation classification score and a right-of-way violation classification score. The machine learning classifier model has been trained to output the plurality of traffic rule violation classification scores based on the information about road signs, the information about traffic signals, the plurality of measurements of the first remote vehicle, and the right-of-way status of the first remote vehicle.

In another aspect of the present disclosure, to determine the right-of-way status of the first remote vehicle, the controller is further programmed to determine the right-of-way status to be the right-of-way violation status in response to determining that the first remote vehicle failed to stop in at least one of the following cases: a pedestrian present in a crosswalk in a path of the first remote vehicle, an emergency vehicle with activated emergency lights in the environment surrounding the first remote vehicle, and a school bus stopping in the path of the first remote vehicle. To determine the right-of-way status of the first remote vehicle, the controller is further programmed to determine the right-of-way status to be the right-of-way violation status in response to determining that the first remote vehicle failed to yield in at least one of the following cases: at a four-way stop when the first remote vehicle does not have right-of-way, the first remote vehicle is making an unprotected left turn, the first remote vehicle is merging onto a highway.

In another aspect of the present disclosure, the vehicle sensor is a camera, and to determine the plurality of visual hazard classification scores of the first remote vehicle, the controller is further programmed to capture an image of the first remote vehicle using the camera and determine the plurality of visual hazard classification scores of the first remote vehicle using a machine learning classifier model. The plurality of visual hazard classification scores includes a vehicle damage classification score, a visual cues of distracted driver classification score, and a distraction risk classification score. The machine learning classifier model has been trained to output the plurality of visual hazard classification scores based on the image of the first remote vehicle.

In another aspect of the present disclosure, the system further includes a display for providing information to an occupant of the vehicle and a vehicle communication system configured for vehicle-to-everything (V2X) communication. To take the action based at least in part on the overall hazard score of the first remote vehicle, the controller is further programmed to perform at least one of the following actions: determine at least one danger zone in an environment surrounding the first remote vehicle and display the at least one danger zone to an occupant of the vehicle using the display, notify the occupant of the vehicle about the overall hazard score of the first remote vehicle using the display, adjust an automated routing system of the vehicle to avoid the first remote vehicle, and transmit the overall hazard score of the first remote vehicle using the vehicle communication system.

According to several aspects, a method for detecting hazards for a vehicle is provided. The method includes performing a plurality of measurements of a first remote vehicle using a vehicle sensor to determine a position, heading, and velocity of the first remote vehicle. The method also includes determining a plurality of classification scores of the first remote vehicle based at least in part on the plurality of measurements of the first remote vehicle. The method also includes determining an overall hazard score of the first remote vehicle based at least in part on the plurality of classification scores of the first remote vehicle. The method also includes notifying an occupant of the vehicle about the overall hazard score of the first remote vehicle using at least one of: a head-up display and a human-machine interface. The method also includes adjusting an automated routing system of the vehicle in response to determining that the overall hazard score of the first remote vehicle is above a predetermined overall hazard score threshold, where the automated routing system of the vehicle is adjusted to avoid the first remote vehicle.

In another aspect of the present disclosure, determining the plurality of classification scores of the first remote vehicle further may include determining an acceptable speed range of the first remote vehicle. Determining the plurality of classification scores of the first remote vehicle further may include determining a speeding classification score of the first remote vehicle based at least in part on the plurality of measurements of the first remote vehicle, where determining the speeding classification score further includes comparing a velocity of the first remote vehicle to the acceptable speed range of the first remote vehicle. Determining the plurality of classification scores of the first remote vehicle further may include determining a plurality of position and speed violation classification scores of the first remote vehicle. Determining the plurality of classification scores of the first remote vehicle further may include determining a plurality of mutual interaction violation classification scores of the first remote vehicle. Determining the plurality of classification scores of the first remote vehicle further may include determining an anomaly detection score of the first remote vehicle. Determining the plurality of classification scores of the first remote vehicle further may include determining a plurality of traffic rule violation classification scores of the first remote vehicle. Determining the plurality of classification scores of the first remote vehicle further may include and determining a plurality of visual hazard classification scores of the first remote vehicle.

In another aspect of the present disclosure, determining the plurality of position and speed violation classification scores of the first remote vehicle further may include retrieving a location of lane edges of a roadway upon which the first remote vehicle is traveling using at least one of: a global navigation satellite system (GNSS) and the vehicle sensor. Determining the plurality of position and speed violation classification scores of the first remote vehicle further may include determining the plurality of position and speed violation classification scores of the first remote vehicle using a machine learning classifier model. The plurality of position and speed violation classification scores includes a lane keeping failure classification score, an excessive turn speed classification score, and an excessive speed change classification score. The machine learning classifier model has been trained to output the plurality of position and speed violation classification scores based on the plurality of measurements of the first remote vehicle and the location of lane edges.

In another aspect of the present disclosure, determining the plurality of mutual interaction violation classification scores of the first remote vehicle further may include determining a distance between the first remote vehicle and a second remote vehicle using the vehicle sensor. Determining the plurality of mutual interaction violation classification scores of the first remote vehicle further may include comparing the distance between the first remote vehicle and the second remote vehicle to a predetermined distance threshold. Determining the plurality of mutual interaction violation classification scores of the first remote vehicle further may include performing a plurality of measurements of the second remote vehicle using the vehicle sensor to determine a position, heading, and velocity of a second remote vehicle in response to determining that the distance between the first remote vehicle and the second remote vehicle is less than or equal to the predetermined distance threshold. Determining the plurality of mutual interaction violation classification scores of the first remote vehicle further may include determining the plurality of mutual interaction violation classification scores of the first remote vehicle using a machine learning classifier model. The plurality of mutual interaction violation classification scores includes a tailgating classification score, a dangerous passing classification score, and a road rage classification score. The machine learning classifier model has been trained to output the plurality of mutual interaction violation classification scores based on the plurality of measurements of the first remote vehicle and the plurality of measurements of the second remote vehicle.

In another aspect of the present disclosure, determining the anomaly detection score of the first remote vehicle further may include determining the anomaly detection score of the first remote vehicle using a machine learning anomaly detection model. The machine learning anomaly detection model has been trained to detect anomalies based on at least one of: the plurality of measurements of the first remote vehicle and geographic data from a global navigation satellite system (GNSS).

In another aspect of the present disclosure, determining the plurality of traffic rule violation classification scores of the first remote vehicle further may include retrieving information about road signs in an environment surrounding the first remote vehicle using at least one of: a GNSS and the vehicle sensor. Determining the plurality of traffic rule violation classification scores of the first remote vehicle further may include retrieving information about traffic signals in the environment surrounding the first remote vehicle using at least one of: the GNSS and the vehicle sensor. Determining the plurality of traffic rule violation classification scores of the first remote vehicle further may include determining a right-of-way status of the first remote vehicle, where the right-of-way status includes a right-of-way violation status and a right-of-way non-violation status. Determining the plurality of traffic rule violation classification scores of the first remote vehicle further may include and determining the plurality of traffic rule violation classification scores of the first remote vehicle using a machine learning classifier model. The plurality of traffic rule violation classification scores includes a road sign violation classification score and a right-of-way violation classification score. The machine learning classifier model has been trained to output the plurality of traffic rule violation classification scores based on the information about road signs, the information about traffic signals, the plurality of measurements of the first remote vehicle, and the right-of-way status of the first remote vehicle.

In another aspect of the present disclosure, determining the plurality of visual hazard classification scores of the first remote vehicle further may include capturing an image of the first remote vehicle using a camera. Determining the plurality of visual hazard classification scores of the first remote vehicle further may include determining the plurality of visual hazard classification scores of the first remote vehicle using a machine learning classifier model. The plurality of visual hazard classification scores includes a vehicle damage classification score, a visual cues of distracted driver classification score, and a distraction risk classification score. The machine learning classifier model has been trained to output the plurality of visual hazard classification scores based on the image of the first remote vehicle.

According to several aspects, a system for detecting hazards for a vehicle is provided. The system includes a camera for determining information about an environment surrounding the vehicle. The system also includes a global navigation satellite system (GNSS) for determining a geographical location, heading, and orientation of the vehicle. The system also includes a vehicle communication system configured for vehicle-to-everything (V2X) communication. The system also includes a display for providing information to an occupant of the vehicle. The system also includes a controller in electrical communication with the camera, the GNSS, the vehicle communication system, and the display. The controller is programmed to perform a plurality of measurements of a first remote vehicle using the camera to determine a position, heading, and velocity of the first remote vehicle. The controller is further programmed to determine a plurality of classification scores of the first remote vehicle based at least in part on the plurality of measurements of the first remote vehicle, where the plurality of classification scores includes at least: a plurality of position and speed violation classification scores, a plurality of mutual interaction violation classification scores, an anomaly detection score, a plurality of traffic rule violation classification scores, and a plurality of visual hazard classification scores. The controller is further programmed to determine an overall hazard score of the first remote vehicle based at least in part on the plurality of classification scores of the first remote vehicle. The controller is further programmed to perform at least one of the following actions based at least in part on the overall hazard score of the first remote vehicle: determine at least one danger zone in an environment surrounding the first remote vehicle and display the at least one danger zone to an occupant of the vehicle using the display, notify the occupant of the vehicle about the overall hazard score of the first remote vehicle using the display, adjust an automated routing system of the vehicle to avoid the first remote vehicle, and transmit the overall hazard score of the first remote vehicle using the vehicle communication system.

In another aspect of the present disclosure, to determine the plurality of classification scores of the first remote vehicle, the controller is further programmed to retrieve information about an environment surrounding the first remote vehicle using the camera. The information about the environment surrounding the first remote vehicle includes at least one of: a plurality of road characteristics, a plurality of road conditions, a location of lane edges, and road sign information. To determine the plurality of classification scores of the first remote vehicle, the controller is further programmed to determine the plurality of classification scores of the first remote vehicle using a machine learning model. The machine learning model is at least one of: a machine learning classifier model, a machine learning regression model, and a machine learning anomaly detection model. The machine learning model determines the plurality of classification scores of the first remote vehicle based at least in part on the plurality of measurements of a first remote vehicle and the information about the environment surrounding the first remote vehicle.

In another aspect of the present disclosure, to determine the overall hazard score of the first remote vehicle, the controller is further programmed to calculate a weighted exponential moving average of the plurality of classification scores of the first remote vehicle. Each of the plurality of classification scores is weighted according to relative hazardousness for occupants of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
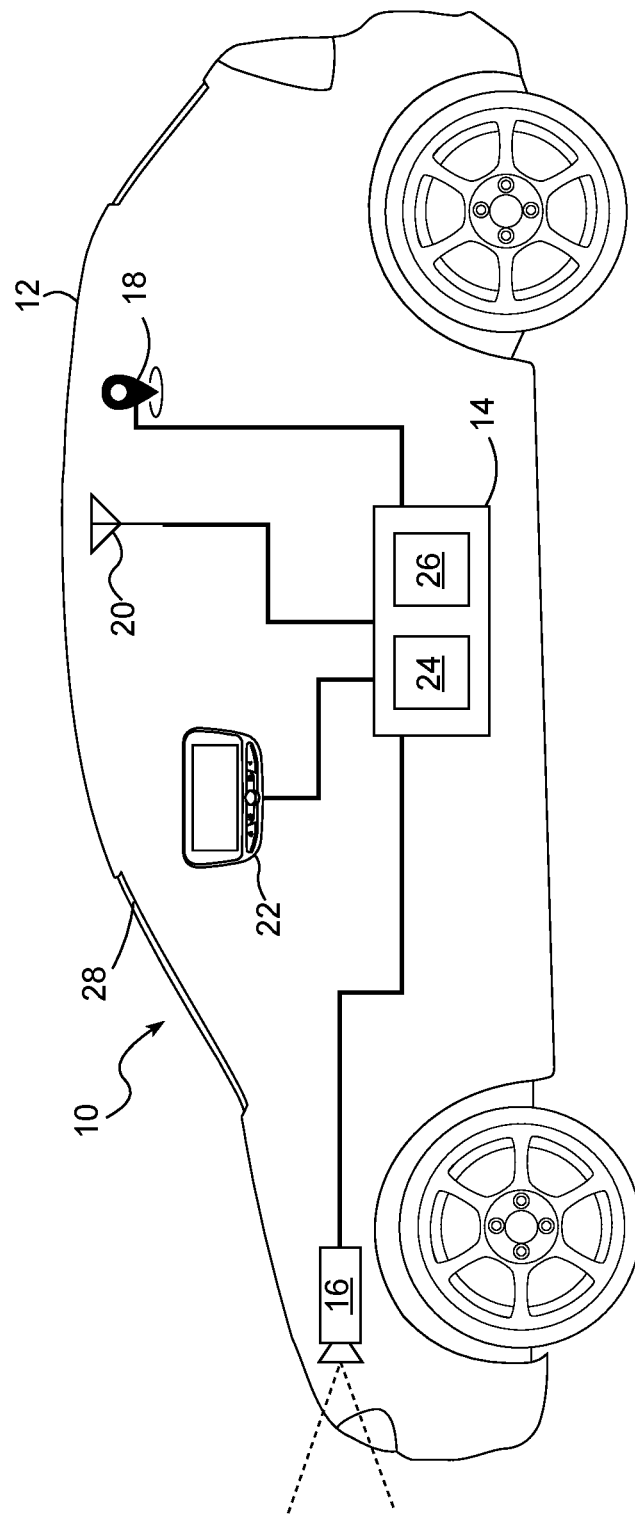
FIG. 1 is a schematic diagram of a system for detecting hazards for a vehicle according to an exemplary embodiment.

Referring to FIG. 1, a system for detecting hazards for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a vehicle sensor 16, a global navigation satellite system (GNSS) 18, a vehicle communication system 20, and a display 22.

The controller 14 is used to implement a method 100 for detecting hazards for a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the vehicle sensor 16, the global navigation satellite system (GNSS) 18, the vehicle communication system 20, and the display 22. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The vehicle sensor 16 is used to gather information about an environment surrounding the vehicle 12, including, for example, distance measurements between the vehicle 12 and a remote vehicle and/or capture images and/or videos of the environment surrounding the vehicle 12. In an exemplary embodiment, the vehicle sensor 16 is a photo and/or video camera which is positioned to view the environment in front of the vehicle 12. In one example, the vehicle sensor 16 is affixed inside of the vehicle 12, for example, in a headliner of the vehicle 12, having a view through a windscreen 28 of the vehicle 12. In another example, the vehicle sensor 16 is affixed outside of the vehicle 12, for example, on a roof of the vehicle 12, having a view of the environment in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. Additionally, it should be understood that use of additional types of sensors, such as, for example, LIDAR, radar, ultrasonic distance measuring, an inertial measurement unit, and the like are within the scope of the present disclosure.

The GNSS 18 is used to determine a geographical location of the vehicle 12 on a map. In an exemplary embodiment, the GNSS 18 includes a GNSS receiver antenna (not shown) and a GNSS controller (not shown) in electrical communication with the GNSS receiver antenna. The GNSS receiver antenna receives signals from a plurality of satellites, and the GNSS controller calculates the geographical location of the vehicle 12 based on the signals received by the GNSS receiver antenna. In an exemplary embodiment, the GNSS 18 additionally includes a map. The map includes information about infrastructure such as municipality borders, roadways, railways, sidewalks, buildings, and the like. Therefore, the geographical location of the vehicle 12 is contextualized using the map information. The map further includes information, such as, for example, road type, road width, road markings (e.g., lane edges), road signage (e.g., road signs and traffic signals), road speed limit, road weather condition, and road lighting condition. In a non-limiting example, the map is retrieved from a remote source using a wireless connection. In another non-limiting example, the map is stored in a database of the GNSS 18.

The vehicle communication system 20 is used by the controller 14 to communicate with other systems external to the vehicle 12. For example, the vehicle communication system 20 includes capabilities for communication with vehicles ("V2V" communication), infrastructure ("V2I" communication), remote systems at a remote call center (e.g., ON-STAR by GENERAL MOTORS) and/or personal devices. In the scope of the present disclosure, the term "V2X" refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles.

The display 22 is used to provide information to an occupant of the vehicle 12. In the scope of the present disclosure, the occupant includes a driver and/or a passenger of the vehicle 12. In the exemplary embodiment depicted in FIG. 1, the display 22 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 22 is disposed in a rearview mirror are also within the scope of the present disclosure. In another exemplary embodiment, the display 22 includes a head-up display (HUD) configured to provide information to the occupant by projecting text, graphics, and/or images upon the windscreen 28. The text, graphics, and/or images are reflected by the windscreen 28 and are visible to the occupant without looking away from a roadway ahead of the vehicle 12. In another exemplary embodiment, the display 22 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. It should be understood that additional systems for displaying information to the occupant of the vehicle 12 are also within the scope of the present disclosure.

Figure 2:
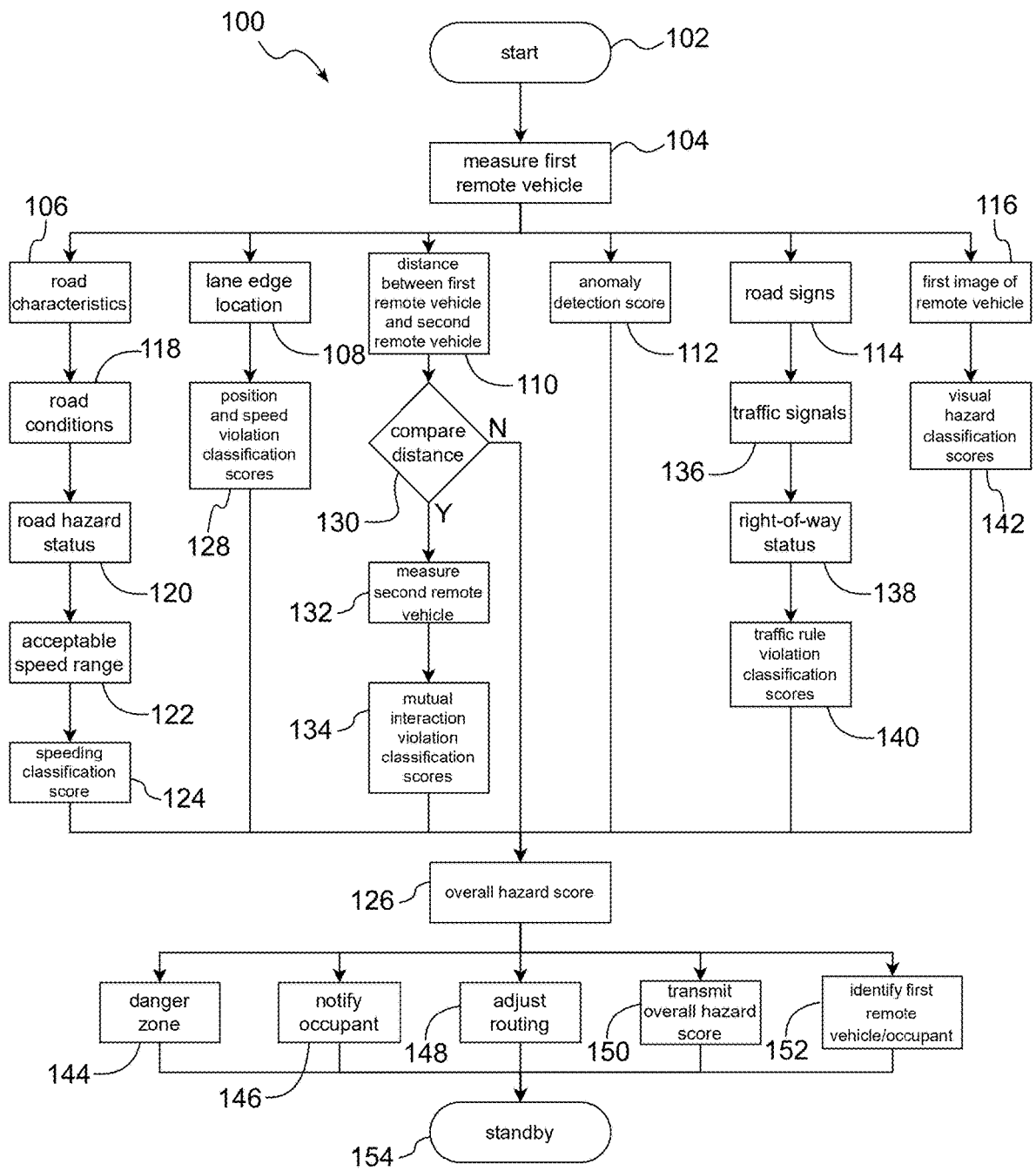
FIG. 2 a flowchart of a method for detecting hazards for a vehicle according to an exemplary embodiment.

Referring to FIG. 2, a flowchart of the method 100 for detecting hazards for a vehicle is shown. The method 100 begins at block 102 and proceeds to block 104. At block 104, the controller 14 performs a plurality of measurements of a first remote vehicle using the vehicle sensor 16. In the scope of the present disclosure, the first remote vehicle is any vehicle in the environment surrounding the vehicle 12. In an exemplary embodiment, the method 100 is performed with multiple remote vehicles in the environment surrounding the vehicle 12, for example, any remote vehicles detected by the vehicle sensor 16. In an exemplary embodiment, the plurality of measurements includes a plurality of distance measurements between the vehicle 12 and the first remote vehicle. Using the plurality of distance measurements, the controller 14 determines a position, heading, and velocity of the first remote vehicle. In a non-limiting example, the controller 14 may also derive an acceleration of the first remote vehicle based on the plurality of measurements. After block 104, the method 100 proceeds to blocks 106, 108, 110, 112, 114, and 116.

At block 106, the controller 14 determines a plurality of road characteristics of a roadway upon which the first remote vehicle is traveling. In an exemplary embodiment, the plurality of road characteristics includes at least one of: a road type (e.g., paved or gravel), an effective road width (i.e., width of the roadway which is unobstructed and therefore drivable, for example, a portion of the roadway may be obstructed with snow, thus decreasing the effective road width), a road speed limit. In an exemplary embodiment, the plurality of road characteristics is determined using the vehicle sensor 16. In a non-limiting example, the vehicle sensor 16 is a camera as described above. The controller 14 uses the camera to capture at least one image of the roadway. By analyzing the at least one image of the roadway, the controller determines the plurality of road characteristics using, for example, a computer vision algorithm (e.g., to determine the road type and effective road width) and a road sign interpretation algorithm (e.g., to parse road signs indicating the road speed limit). In a non-limiting example, the traffic sign interpretation algorithm includes an optical character recognition algorithm. In another exemplary embodiment, the plurality of road characteristics is determined using the GNSS 18. The controller 14 identifies a location of the vehicle 12 using the GNSS 18 and a location of the first remote vehicle based on the location of the vehicle 12 and the plurality of measurements taken at block 104. As described above, the GNSS 18 contains or may access the plurality of road characteristics for the roadway upon which the first remote vehicle is traveling. After block 106, the method 100 proceeds to block 118.

At block 118, the controller 14 determines a plurality of road conditions of the roadway upon which the first remote vehicle is traveling. In an exemplary embodiment, the plurality of road conditions includes at least one of: a road weather condition (e.g., ice, rain, snow, fog), a road moisture condition (i.e., an estimated moisture of a surface of the roadway due to the road weather condition), a road lighting condition (i.e., whether or not the surface of the roadway is illuminated by streetlights). In an exemplary embodiment, the plurality of road conditions is determined using the vehicle sensor 16. In a non-limiting example, the vehicle sensor 16 is a camera as described above. The controller 14 uses the camera to capture an image of the roadway. By analyzing the image of the roadway, the controller determines the plurality of road conditions using, for example, a computer vision algorithm. In another exemplary embodiment, the plurality of road conditions is determined using the GNSS 18. The controller 14 identifies a location of the vehicle 12 using the GNSS 18 and a location of the first remote vehicle based on the location of the vehicle 12 and the plurality of measurements taken at block 104. In an exemplary embodiment, the location of the vehicle 12 is also determined using the vehicle sensor 16 (e.g., camera). As described above, the GNSS 18 contains or may access the plurality of road conditions for the roadway upon which the first remote vehicle is traveling. After block 118, the method 100 proceeds to block 120.

At block 120, the controller 14 determines a plurality of road hazard statuses of the roadway upon which the first remote vehicle is traveling. In an exemplary embodiment, the plurality of road hazard statuses includes at least one of: a pedestrian presence status (i.e., whether or not a pedestrian is present near the first remote vehicle), a bicyclist presence status (i.e., whether or not a bicyclist is present near the first remote vehicle), and a congestion hazard status (i.e., an extent to which heavy vehicular traffic is present near the first remote vehicle). In an exemplary embodiment, the plurality of road hazard statuses is determined using the vehicle sensor 16. In a non-limiting example, the vehicle sensor 16 is a camera as described above. The controller 14 uses the camera to capture an image of the roadway. By analyzing the image of the roadway, the controller determines the plurality of road hazard statuses using, for example, a computer vision algorithm. After block 120, the method 100 proceeds to block 122.

At block 122, the controller 14 calculates an acceptable speed range of the first remote vehicle. The acceptable speed range of the first remote vehicle is used to determine a speeding classification score of the first remote vehicle, as will be discussed below. In the scope of the present disclosure, the acceptable speed range is a range of speeds which are deemed to be acceptable based on the plurality of road characteristics, the plurality of road conditions, and the plurality of road hazard statuses. In a non-limiting example, an upper limit of the acceptable speed range may be ten miles per hour less than the road speed limit because of adverse weather conditions. Similarly, heavy vehicular traffic may cause a reduction in a lower limit of the acceptable speed range because the traffic prevents the first remote vehicle from traveling faster. In an exemplary embodiment, the acceptable speed range of the first remote vehicle is calculated using a machine learning regression model. In a non-limiting example, the machine learning regression model is trained using supervised learning (i.e., by training the algorithm with a plurality of inputs which have been pre-assigned with acceptable speed ranges). In another non-limiting example, the machine learning regression model is trained using semi-supervised learning (i.e., by training the algorithm with a plurality of inputs which have been pre-assigned with acceptable speed ranges and a plurality of inputs which have not been pre-assigned with acceptable speed ranges). The machine learning regression model is trained to output the acceptable speed range based on the plurality of road characteristics (determined at block 106), the plurality of road conditions (determined at block 118), and the plurality of road hazard statuses (determined at block 120). After block 122, the method 100 proceeds to block 124.

At block 124, the speeding classification score of the first remote vehicle is determined based at least in part on the plurality of measurements taken at block 104. In an exemplary embodiment, to determine the speeding classification score, the controller 14 determines a velocity of the first remote vehicle based on the plurality of measurements taken at block 104. The velocity of the first remote vehicle is compared to the acceptable speed range determined at block 122 to determine the speeding classification score. In a non-limiting example, the speeding classification score increases exponentially as the velocity increases above the upper limit of the acceptable speed range or decreases below the lower limit of the acceptable speed range. If the velocity is within the acceptable speed range, the speeding classification score is zero. After block 124, the method 100 proceeds to block 126 as will be discussed in greater detail below.

At block 108, the controller 14 retrieves a location of lane edges of the roadway upon which the first remote vehicle is traveling. In the scope of the present disclosure, the lane edges of the roadway are markings painted on a surface of the roadway which define lanes of travel. Frequent departures from defined lanes of travel by the first remote vehicle may indicate a hazard. In an exemplary embodiment, the plurality of road conditions is determined using the vehicle sensor 16. In a non-limiting example, the vehicle sensor 16 is a camera as described above. The controller 14 uses the camera to capture at least one image of the roadway. By analyzing the at least one image of the roadway, the controller determines the location of lane edges of the roadway using, for example, a computer vision algorithm. In another exemplary embodiment, the plurality of road conditions is determined using the GNSS 18. The controller 14 identifies a location of the vehicle 12 using the GNSS 18 and a location of the first remote vehicle based on the location of the vehicle 12 and the plurality of measurements taken at block 104. As described above, the GNSS 18 contains or may access the location of lane edges of the roadway upon which the first remote vehicle is traveling. After block 108, the method 100 proceeds to block 128.

At block 128, the controller 14 determines a plurality of position and speed violation classification scores for the first remote vehicle using a machine learning classifier model. The machine learning classifier model may be trained using supervised or semi-supervised learning. In an exemplary embodiment, the machine learning classifier model is configured to output a value for each of the plurality of position and speed behavior scores based on the plurality of measurements taken at block 104, the location of lane edges determined at block 108, and the map accessible by the GNSS 18 as discussed above. In an exemplary embodiment, the plurality of position and speed violation classification scores includes a lane keeping failure classification score, an excessive turn speed classification score, and an excessive speed change classification score. In another exemplary embodiment, the plurality of position and speed violation classification scores further includes a wrong direction classification score and an erratic driving classification score. In the scope of the present disclosure, the lane keeping failure classification score is a quantification of how often the first remote vehicle departs from a defined lane of travel. In the scope of the present disclosure, the excessive turn speed classification score is a quantification of a turning speed of the first remote vehicle. In the scope of the present disclosure, the excessive speed change classification score is a quantification of how often a speed of the first remote vehicle changes. In the scope of the present disclosure, the wrong direction classification score quantifies whether the first remote vehicle is traveling in a wrong direction against a normal flow of traffic (i.e., wrong direction on a one-way roadway). In the scope of the present disclosure, the erratic driving classification score quantifies an extent to which the first remote vehicle is driving erratically, such as, for example, weaving in and out of traffic.

After block 128, the method 100 proceeds to block 126 as will be discussed in greater detail below.

At block 110, a distance between the first remote vehicle and a second remote vehicle is determined using the vehicle sensor 16. After block 110, the method 100 proceeds to block 130.

At block 130, the distance determined at block 110 is compared to a predetermined distance threshold (e.g., ten meters). If the distance determined at block 110 is greater than the predetermined distance threshold, the method 100 proceeds to block 126 as will be discussed in greater detail below. If the distance determined at block 110 is less than or equal to the predetermined distance threshold, the method 100 proceeds to block 132.

At block 132, the controller 14 performs a plurality of measurements of the second remote vehicle using the vehicle sensor 16. In an exemplary embodiment, the plurality of measurements includes a plurality of distance measurements between the vehicle 12 and the second remote vehicle. Using the plurality of distance measurements, the controller 14 determines a position, heading, and velocity of the second remote vehicle. In a non-limiting example, the controller 14 may also derive an acceleration of the second remote vehicle based on the plurality of measurements. After block 132, the method 100 proceeds to block 134.

At block 134, the controller 14 determines a plurality of mutual interaction violation classification scores for the first remote vehicle using a machine learning classifier model. The machine learning classifier model may be trained using supervised or semi-supervised learning. In an exemplary embodiment, the machine learning classifier model is configured to output a value for each of the plurality of mutual interaction violation classification scores based on the plurality of measurements taken at block 104 and the plurality of measurements taken at block 132. In an exemplary embodiment, plurality of mutual interaction violation classification scores includes a tailgating classification score, a dangerous passing classification score, and a road rage classification score. In the scope of the present disclosure, the tailgating classification score is a quantification of an extent to which the first remote vehicle is determined to be tailgating the second remote vehicle (i.e., failing to maintain a safe following distance). In the scope of the present disclosure, the dangerous passing classification score is a quantification of whether the first remote vehicle has overtaken the second remote vehicle in a dangerous manner (e.g., overtaking in a low-visibility area of the roadway). In the scope of the present disclosure, the road rage classification score is a quantification of how often the first remote vehicle exhibits characteristics of road rage towards the second remote vehicle (e.g., sudden braking or acceleration near the second remote vehicle, cutting off the second remote vehicle, and/or causing the second remote vehicle to take evasive action to avoid a collision). After block 134, the method 100 proceeds to block 126 as will be discussed in greater detail below.

At block 112, the controller 14 determines an anomaly detection score of the first remote vehicle. In the scope of the present disclosure, the anomaly detection score quantifies an extent to which actions of the first remote vehicle deviate significantly from a well-defined notion of normal behavior. In a non-limiting example, actions of the first remote vehicle which deviate significantly from the well-defined notion of normal behavior include unusual behaviors which may not violate traffic laws, but may surprise other drivers, for example, swerving within a defined lane of travel, stopping in the roadway, and/or making an unexpected U-turn. In an exemplary embodiment, the plurality of measurements taken at block 104 are analyzed to identify events which deviate significantly from a majority of the plurality of measurements. In a non-limiting example, a machine learning anomaly detection model is trained using supervised or semi-supervised learning to output an anomaly detection score based on the plurality of measurements taken at block 104. In another non-limiting example, the machine learning anomaly detection model is trained using supervised or semi-supervised learning to output an anomaly detection score based on the plurality of measurements taken at block 104 and information from the GNSS 18 (e.g., road type, road width, road markings, road speed limit, road weather condition). After block 112, the method 100 proceeds to block 126 as will be discussed in greater detail below.

At block 114, the controller 14 retrieves information about road signs in an environment surrounding the first remote vehicle. In an exemplary embodiment, the controller 14 uses the vehicle sensor 16 (e.g., camera) to capture an image of the environment surrounding the first remote vehicle. Using, for example, an object detection algorithm, the controller 14 identifies road signs. Using, for example, a road sign interpretation algorithm (including, for example, an optical character recognition algorithm), the controller 14 parses text on the road signs to determine a meaning of the road signs. In another exemplary embodiment, the controller 14 retrieves information about the road signs using the GNSS 18 as discussed above. After block 114, the method 100 proceeds to block 136.

At block 136, the controller 14 retrieves information about traffic signals in an environment surrounding the first remote vehicle. In an exemplary embodiment, the controller 14 uses the vehicle sensor 16 (e.g., camera) to capture an image of the environment surrounding the first remote vehicle. Using, for example, an object detection algorithm, the controller 14 identifies traffic signals and determines a state of the traffic signals (e.g., red light or green light). In another exemplary embodiment, the controller 14 retrieves information about the traffic signals using the GNSS 18 as discussed above. After block 136, the method 100 proceeds to block 138.

At block 138, the controller 14 determines a right-of-way status of the first remote vehicle. The right-of-way status may be a right-of-way violation status or a right-of-way non-violation status. In the scope of the present disclosure, the right-of-way violation status means that the first remote vehicle failed to stop or yield in a situation wherein the first remote vehicle did not have right-of-way. In a non-limiting example, the first remote vehicle is expected to stop if a pedestrian present in a crosswalk in a path of the first remote vehicle, an emergency vehicle with activated emergency lights is present in the environment surrounding the first remote vehicle, and/or a school bus is stopping in the path of the first remote vehicle. In a non-limiting example, the first remote vehicle is expected to yield if the first remote vehicle is at a four-way stop and does not have right-of-way (e.g., the first remote vehicle has arrived at the four-way stop simultaneously with other vehicles or after another remote vehicle is already at the four-way stop), the first remote vehicle is making an unprotected left turn, and/or the first remote vehicle is merging onto a highway. In an exemplary embodiment, the controller 14 determines the right-of-way status using at least one of: the vehicle sensor 16 (e.g., by capturing at least one image and identifying right-of-way status using object detection), the GNSS 18 (e.g., using data about road configuration), and/or the vehicle communication system 20 (e.g., by communicating with other remote vehicles to determine right-of-way status). After block 138, the method 100 proceeds to block 140.

At block 140, the controller 14 determines a plurality of traffic rule violation classification scores for the first remote vehicle using a machine learning classifier model. The machine learning classifier model may be trained using supervised or semi-supervised learning. In an exemplary embodiment, the machine learning classifier model is configured to output a value for each of the plurality of traffic rule violation classification scores based on the plurality of measurements taken at block 104, the information about road signs retrieved at block 114, the information about traffic signals retrieved at block 136, and the right-of-way status determined at block 138. In an exemplary embodiment, the plurality of traffic rule violation classification scores includes a road sign violation classification score and a right-of-way violation classification score. In the scope of the present disclosure, the road sign violation classification score is a quantification of an extent to which the first remote vehicle is determined to be violating road signs. In a non-limiting example, road sign violations include not completely stopping at a stop sign, running a red traffic signal, stopping longer than needed at a stop sign or traffic signal, and sudden braking in response to a road sign or traffic signal. In the scope of the present disclosure, the right-of-way violation classification score is a quantification of an extent to which the first remote vehicle is determined to be violating right-of-way traffic rules. In a non-limiting example, violating right-of-way traffic rules includes any activities associated with the right-of-way violation status as discussed above in reference to block 138. After block 140, the method 100 proceeds to block 126 as will be discussed in greater detail below.

At block 116, the controller 14 captures an image of the first remote vehicle using the vehicle sensor 16. In an exemplary embodiment, the vehicle sensor 16 is a camera. In a non-limiting example, the image includes an interior of the first remote vehicle and an exterior of the first remote vehicle. After block 116, the method 100 proceeds to block 142.

At block 142, the controller 14 determines a plurality of visual hazard classification scores for the first remote vehicle using a machine learning classifier model. The machine learning classifier model may be trained using supervised or semi-supervised learning. In an exemplary embodiment, the machine learning classifier model is configured to output a value for each of the plurality of visual hazard classification scores based on the image of the remote vehicle captured at block 116. In an exemplary embodiment, plurality of visual hazard classification scores includes a vehicle damage classification score, a distraction risk classification score, and a visual cues of distracted driver classification score. In the scope of the present disclosure, the vehicle damage classification score is a quantification of an extent to which damage to the first remote vehicle may present a hazard. In a non-limiting example, damage to the first remote vehicle includes non-functional indicator and/or safety lights (e.g., headlights, taillights, brake lights, turn signals). In the scope of the present disclosure, the distraction risk classification score is a quantification of an extent to which an occupant of the first remote vehicle may be at risk of distraction by conditions within the first remote vehicle. In a non-limiting example, distraction risks to an occupant of the first remote vehicle include pets present in the first remote vehicle and/or children present in the first remote vehicle. In the scope of the present disclosure, the visual cues of distracted driver classification score is a quantification of an extent to which the occupant of the first remote vehicle is distracted. In a non-limiting example, indications that the occupant of the first remote vehicle is distracted include the occupant of the first remote vehicle holding and/or interacting with a mobile device (e.g., cellphone) and/or the lack of occupant interaction with a steering wheel of the first remote vehicle (i.e., occupant of the first remote vehicle not having at least one hand on the steering wheel of the first remote vehicle). In an exemplary embodiment wherein the first remote vehicle is an automated vehicle (i.e., capable of automated driving without occupant steering input), lack of occupant interaction with the steering wheel of the first remote vehicle is not an indication of distraction. After block 142, the method 100 proceeds to block 126 as will be discussed in greater detail below.

At block 126, the controller 14 determines an overall hazard score of the first remote vehicle based on the plurality of classification scores of the first remote vehicle determined at blocks 124, 128, 134, 112, 140, and 142. In an exemplary embodiment, the overall hazard score is a weighted exponential moving average of the plurality of classification scores. In a non-limiting example, each of the plurality of classification scores is weighted according to a relative hazardousness for the occupant of the vehicle 12. For example, a relative hazardousness of the distraction risk classification score is less than a relative hazardousness of the visual cues of distracted driver classification score, because the former indicates a risk of distraction while the latter indicates that the driver of the first remote vehicle is imminently distracted. Therefore, in a non-limiting example, the distraction risk classification score is weighted less than the visual cues of distracted driver classification score. In a non-limiting example, the relative hazardousness and thus the weight for each of the plurality of classification scores may be predetermined or adjusted based on preferences of the occupant of the vehicle 12. After block 126, the method 100 proceeds to blocks 144, 146, 148, 150, 152.

At block 144, the controller 14 determines at least one danger zone in the environment surrounding the first remote vehicle and displays the at least one danger zone to the occupant of the vehicle 12 using the display 22. In an exemplary embodiment, the at least one danger zone is an area in the environment surrounding the first remote vehicle which is determined to be hazardous to the vehicle 12. For example, if it is determined at block 128 that the first remote vehicle may depart from the defined lane of travel based on the lane keeping failure classification score of the first remote vehicle, the at least one danger zone may include lanes of travel which are adjacent to a location of the first remote vehicle. In another example, if it is determined at block 142 that a left turn signal of the first remote vehicle is non-functional, the at least one danger zone may include an area surrounding a left side of the first remote vehicle. In an exemplary embodiment, the at least one danger zone is visualized using a graphic and/or an animation and displayed to the occupant of the vehicle 12 using the display 22.

At block 146, the controller 14 uses the display 22 to notify the occupant of the vehicle 12 about the overall hazard score of the first remote vehicle. In an exemplary embodiment, if the first remote vehicle is within a predetermined distance from the vehicle 12 and the overall hazard score of the first remote vehicle is greater than or equal to a predetermined hazard score threshold, the display 22 is used to provide a warning to the occupant of the vehicle 12. In another exemplary embodiment wherein the display 22 is an AR-HUD (as discussed above), the overall hazard score of the first remote vehicle is overlayed on the first remote vehicle within the field-of-view of the occupant of the vehicle 12.

At block 148, in an exemplary embodiment wherein the first remote vehicle is an automated vehicle (i.e., capable of automated driving without occupant steering, brake, and/or accelerator input), the controller 14 adjusts an automated routing system of the vehicle 12 based on the overall hazard score of the first remote vehicle. In the scope of the present disclosure, the automated routing system is a software which determines a route for an automated vehicle based on various factors, for example, conditions in an environment surrounding the automated vehicle. In a non-limiting example, if the overall hazard score of the first remote vehicle is greater than or equal to a predetermined hazard score threshold, the automated routing system is adjusted such that the vehicle 12 avoids traveling near the first remote vehicle.

At block 150, the controller 14 uses the vehicle communication system 20 to transmit the overall hazard score of the first remote vehicle 12. In an exemplary embodiment, the overall hazard score of the first remote vehicle is transmitted to a central server, such that further remote vehicles may establish a connection to the central server and retrieve the overall hazard score of the first remote vehicle. In another exemplary embodiment, the overall hazard score of the first remote vehicle is transmitted to a plurality of remote vehicles near the first remote vehicle.

At block 152, if the overall hazard score of the first remote vehicle is greater than or equal to a predetermined hazard score threshold, the controller 14 performs facial recognition using an image of the occupant of the first remote vehicle captured using the vehicle sensor 16 to identify the occupant of the first remote vehicle. In a further exemplary embodiment, if the overall hazard score of the first remote vehicle is greater than or equal to a predetermined hazard score threshold, the controller 14 uses the vehicle sensor 16 capture an image of a license plate of the first remote vehicle. The identification of the occupant of the first remote vehicle and the image of the license plate of the first remote vehicle may be store in the media 26 of the controller 14 and/or transmitted to the central server using the vehicle communication system 20.

After blocks 144, 146, 148, 150, 152, the method 100 proceeds to enter a standby state at block 154. In an exemplary embodiment, the controller 14 repeatedly exits the standby state 154 and restarts the method 100 at block 102. In a non-limiting example, the controller 14 exits the standby state 154 and restarts the method 100 on a timer, for example, every three hundred milliseconds.

The system 10 and method 100 of the present disclosure offers several advantages. By detecting hazards for the vehicle 12, the system 10 and the method 100 are used to increase occupant awareness and thus safety. For example, by determining the plurality of classification scores, the controller 14 quantifies behaviors of the first remote vehicle, allowing interpretation of a hazardousness of the first remote vehicle using the overall hazard score. By transmitting the hazardousness information to further remote vehicles, overall roadway safety may be increased.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting hazards for a vehicle, the system comprising:
   a vehicle sensor for determining information about an environment surrounding the vehicle;
   a global navigation satellite system (GNSS) for determining a geographical location, heading, and orientation of the vehicle;
   a controller in electrical communication with the vehicle sensor and the GNSS, wherein the controller is programmed to:
   perform a plurality of measurements of a first remote vehicle using the vehicle sensor to determine a position, heading, and velocity of the first remote vehicle;
   determine a plurality of classification scores of the first remote vehicle based at least in part on the plurality of measurements of the first remote vehicle, wherein to determine the plurality of classification scores, the controller is further programmed to:
   determine a plurality of position and speed violation classification scores of the first remote vehicle using a first machine learning classifier model;
   determine a plurality of mutual interaction violation classification scores of the first remote vehicle using a second machine learning classifier model;
   determine an anomaly detection score of the first remote vehicle using a machine learning anomaly detection model;

determine a plurality of traffic rule violation classification scores of the first remote vehicle using a third machine learning classifier model; and
determine a plurality of visual hazard classification scores of the first remote vehicle using a fourth machine learning classifier model;
determine an overall hazard score of the first remote vehicle based at least in part on the plurality of classification scores of the first remote vehicle, wherein the overall hazard score of the first remote vehicle is a weighted exponential moving average of the plurality of position and speed violation classification scores, the plurality of mutual interaction violation classification scores, the anomaly detection score, the plurality of traffic rule violation classification scores, and the plurality of visual hazard classification scores; and
control the vehicle using an automated routing system to guide the vehicle away from the first remote vehicle in response to determining that the overall hazard score of the first remote vehicle is above a predetermined overall hazard score threshold.

2. The system of claim 1, wherein to determine the plurality of classification scores of the first remote vehicle, the controller is further programmed to:
determine an acceptable speed range of the first remote vehicle; and
determine a speeding classification score of the first remote vehicle based at least in part on the plurality of measurements of the first remote vehicle,
wherein to determine the speeding classification score, the controller is further programmed to compare a velocity of the first remote vehicle to the acceptable speed range of the first remote vehicle.

3. The system of claim 2, wherein to determine the acceptable speed range of the first remote vehicle, the controller is further programmed to:
determine a plurality of road characteristics of a roadway upon which the first remote vehicle is traveling using at least one of: the vehicle sensor and the GNSS,
wherein the plurality of road characteristics includes at least one of: a road type, an effective road width, and a road speed limit;
determine a plurality of road conditions of the roadway upon which the first remote vehicle is traveling using at least one of: the vehicle sensor and the GNSS,
wherein the plurality of road conditions includes at least one of: a road weather condition, a road moisture condition, and a road lighting condition;
determine a plurality of road hazard statuses of the roadway upon which the first remote vehicle is traveling using the vehicle sensor,
wherein the plurality of road hazard statuses includes at least one of: a pedestrian presence status, a bicyclist presence status, and a congestion hazard status; and
calculate the acceptable speed range of the first remote vehicle using a machine learning regression model,
wherein the machine learning regression model has been trained to output the acceptable speed range of the first remote vehicle based on the plurality of road characteristics, the plurality of road conditions, and the plurality of road hazard statuses of the roadway upon which the first remote vehicle is traveling.

4. The system of claim 1, wherein to determine the plurality of position and speed violation classification scores of the first remote vehicle, the controller is further programmed to:
retrieve a location of lane edges of a roadway upon which the first remote vehicle is traveling using at least one of: the GNSS and the vehicle sensor; and
determine the plurality of position and speed violation classification scores of the first remote vehicle using the first machine learning classifier model,
wherein the plurality of position and speed violation classification scores includes a lane keeping failure classification score, an excessive turn speed classification score, and an excessive speed change classification score, and
wherein the first machine learning classifier model has been trained to output the plurality of position and speed violation classification scores based on the plurality of measurements of the first remote vehicle and the location of lane edges.

5. The system of claim 1, wherein to determine the plurality of mutual interaction violation classification scores of the first remote vehicle, the controller is further programmed to:
determine a distance between the first remote vehicle and a second remote vehicle using the vehicle sensor;
compare the distance between the first remote vehicle and the second remote vehicle to a predetermined distance threshold;
perform a plurality of measurements of the second remote vehicle using the vehicle sensor to determine a position, heading, and velocity of a second remote vehicle in response to determining that the distance between the first remote vehicle and the second remote vehicle is less than or equal to the predetermined distance threshold; and
determine the plurality of mutual interaction violation classification scores of the first remote vehicle using the second machine learning classifier model,
wherein the plurality of mutual interaction violation classification scores includes a tailgating classification score, a dangerous passing classification score, and a road rage classification score, and
wherein the second machine learning classifier model has been trained to output the plurality of mutual interaction violation classification scores based on the plurality of measurements of the first remote vehicle and the plurality of measurements of the second remote vehicle.

6. The system of claim 1, wherein to determine the anomaly detection score of the first remote vehicle, the controller is further programmed to:
determine the anomaly detection score of the first remote vehicle using the machine learning anomaly detection model,
wherein the machine learning anomaly detection model has been trained to detect anomalies based on at least one of: the plurality of measurements of the first remote vehicle and geographic data from the GNSS.

7. The system of claim 1, wherein to determine the plurality of traffic rule violation classification scores of the first remote vehicle, the controller is further programmed to:
retrieve information about road signs in an environment surrounding the first remote vehicle using at least one of: the GNSS and the vehicle sensor;
retrieve information about traffic signals in the environment surrounding the first remote vehicle using at least one of: the GNSS and the vehicle sensor;

determine a right-of-way status of the first remote vehicle, wherein the right-of-way status includes a right-of-way violation status and a right-of-way non-violation status; and determine the plurality of traffic rule violation classification scores of the first remote vehicle using the third machine learning classifier model,
wherein the plurality of traffic rule violation classification scores includes a road sign violation classification score and a right-of-way violation classification score, and
wherein the third machine learning classifier model has been trained to output the plurality of traffic rule violation classification scores based on the information about road signs, the information about traffic signals, the plurality of measurements of the first remote vehicle, and the right-of-way status of the first remote vehicle.

8. The system of claim 7, wherein to determine the right-of-way status of the first remote vehicle, the controller is further programmed to:
determine the right-of-way status to be the right-of-way violation status in response to determining that the first remote vehicle failed to stop in at least one of the following cases: a pedestrian present in a crosswalk in a path of the first remote vehicle, an emergency vehicle with activated emergency lights in the environment surrounding the first remote vehicle, and a school bus stopping in the path of the first remote vehicle; and
determine the right-of-way status to be the right-of-way violation status in response to determining that the first remote vehicle failed to yield in at least one of the following cases: at a four-way stop when the first remote vehicle does not have right-of-way, the first remote vehicle is making an unprotected left turn, the first remote vehicle is merging onto a highway.

9. The system of claim 1, wherein the vehicle sensor is a camera, and wherein to determine the plurality of visual hazard classification scores of the first remote vehicle, the controller is further programmed to:
capture an image of the first remote vehicle using the camera; and
determine the plurality of visual hazard classification scores of the first remote vehicle using the fourth machine learning classifier model,
wherein the plurality of visual hazard classification scores includes a vehicle damage classification score, a visual cues of distracted driver classification score, and a distraction risk classification score, and
wherein the fourth machine learning classifier model has been trained to output the plurality of visual hazard classification scores based on the image of the first remote vehicle.

10. The system of claim 1, further comprising a display for providing information to an occupant of the vehicle and a vehicle communication system configured for vehicle-to-everything (V2X) communication, wherein the controller is further programmed to:
perform at least one of the following actions:
determine at least one danger zone in an environment surrounding the first remote vehicle and display the at least one danger zone to an occupant of the vehicle using the display;
notify the occupant of the vehicle about the overall hazard score of the first remote vehicle using the display; and
transmit the overall hazard score of the first remote vehicle using the vehicle communication system.

11. A method for detecting hazards for a vehicle, the method comprising:
performing a plurality of measurements of a first remote vehicle using a vehicle sensor to determine a position, heading, and velocity of the first remote vehicle;
determining a plurality of classification scores of the first remote vehicle based at least in part on the plurality of measurements of the first remote vehicle, wherein determining the plurality of classification scores further comprises:
determining a plurality of position and speed violation classification scores of the first remote vehicle using a first machine learning classifier model;
determining a plurality of mutual interaction violation classification scores of the first remote vehicle using a second machine learning classifier model;
determining an anomaly detection score of the first remote vehicle using a machine learning anomaly detection model;
determining a plurality of traffic rule violation classification scores of the first remote vehicle using a third machine learning classifier model; and
determining a plurality of visual hazard classification scores of the first remote vehicle using a fourth machine learning classifier model;
determining an overall hazard score of the first remote vehicle based at least in part on the plurality of classification scores of the first remote vehicle, wherein the overall hazard score of the first remote vehicle is a weighted exponential moving average of the plurality of position and speed violation classification scores, the plurality of mutual interaction violation classification scores, the anomaly detection score, the plurality of traffic rule violation classification scores, and the plurality of visual hazard classification scores;
notifying an occupant of the vehicle about the overall hazard score of the first remote vehicle using at least one of: a head-up display and a human-machine interface; and
controlling the vehicle using an automated routing system of the vehicle in response to determining that the overall hazard score of the first remote vehicle is above a predetermined overall hazard score threshold, wherein the automated routing system of the vehicle is adjusted to guide the vehicle away from the first remote vehicle.

12. The method of claim 11, wherein determining the plurality of classification scores of the first remote vehicle further comprises:
determining an acceptable speed range of the first remote vehicle; and
determining a speeding classification score of the first remote vehicle based at least in part on the plurality of measurements of the first remote vehicle,
wherein determining the speeding classification score further includes comparing a velocity of the first remote vehicle to the acceptable speed range of the first remote vehicle.

13. The method of claim 11, wherein determining the plurality of position and speed violation classification scores of the first remote vehicle further comprises:
retrieving a location of lane edges of a roadway upon which the first remote vehicle is traveling using at least one of: a global navigation satellite system (GNSS) and the vehicle sensor; and determining the plurality of position and speed violation classification scores of the first remote vehicle using the first machine learning classifier model,
   wherein the plurality of position and speed violation classification scores includes a lane keeping failure classification score, an excessive turn speed classification score, and an excessive speed change classification score, and
   wherein the first machine learning classifier model has been trained to output the plurality of position and speed violation classification scores based on the plurality of measurements of the first remote vehicle and the location of lane edges.

14. The method of claim 11, wherein determining the plurality of mutual interaction violation classification scores of the first remote vehicle further comprises:
   determining a distance between the first remote vehicle and a second remote vehicle using the vehicle sensor;
   comparing the distance between the first remote vehicle and the second remote vehicle to a predetermined distance threshold;
   performing a plurality of measurements of the second remote vehicle using the vehicle sensor to determine a position, heading, and velocity of a second remote vehicle in response to determining that the distance between the first remote vehicle and the second remote vehicle is less than or equal to the predetermined distance threshold; and
   determining the plurality of mutual interaction violation classification scores of the first remote vehicle using the second machine learning classifier model,
      wherein the plurality of mutual interaction violation classification scores includes a tailgating classification score, a dangerous passing classification score, and a road rage classification score, and
      wherein the second machine learning classifier model has been trained to output the plurality of mutual interaction violation classification scores based on the plurality of measurements of the first remote vehicle and the plurality of measurements of the second remote vehicle.

15. The method of claim 11, wherein determining the anomaly detection score of the first remote vehicle further comprises:
   determining the anomaly detection score of the first remote vehicle using the machine learning anomaly detection model,
      wherein the machine learning anomaly detection model has been trained to detect anomalies based on at least one of: the plurality of measurements of the first remote vehicle and geographic data from a global navigation satellite system (GNSS).

16. The method of claim 11, wherein determining the plurality of traffic rule violation classification scores of the first remote vehicle further comprises:
   retrieving information about road signs in an environment surrounding the first remote vehicle using at least one of: a GNSS and the vehicle sensor;
   retrieving information about traffic signals in the environment surrounding the first remote vehicle using at least one of: the GNSS and the vehicle sensor;
   determining a right-of-way status of the first remote vehicle, wherein the right-of-way status includes a right-of-way violation status and a right-of-way non-violation status; and
   determining the plurality of traffic rule violation classification scores of the first remote vehicle using the third machine learning classifier model,
      wherein the plurality of traffic rule violation classification scores includes a road sign violation classification score and a right-of-way violation classification score, and
      wherein the third machine learning classifier model has been trained to output the plurality of traffic rule violation classification scores based on the information about road signs, the information about traffic signals, the plurality of measurements of the first remote vehicle, and the right-of-way status of the first remote vehicle.

17. The method of claim 11, wherein determining the plurality of visual hazard classification scores of the first remote vehicle further comprises:
   capturing an image of the first remote vehicle using a camera; and
   determining the plurality of visual hazard classification scores of the first remote vehicle using the fourth machine learning classifier model,
      wherein the plurality of visual hazard classification scores includes a vehicle damage classification score, a visual cues of distracted driver classification score, and a distraction risk classification score, and
      wherein the fourth machine learning classifier model has been trained to output the plurality of visual hazard classification scores based on the image of the first remote vehicle.

18. A system for detecting hazards for a vehicle, the system comprising:
   a camera for determining information about an environment surrounding the vehicle;
   a global navigation satellite system (GNSS) for determining a geographical location, heading, and orientation of the vehicle;
   a vehicle communication system configured for vehicle-to-everything (V2X) communication;
   a display for providing information to an occupant of the vehicle; and
   a controller in electrical communication with the camera, the GNSS, the vehicle communication system, and the display, wherein the controller is programmed to:
      perform a plurality of measurements of a first remote vehicle using the camera to determine a position, heading, and velocity of the first remote vehicle;
      determine a plurality of classification scores of the first remote vehicle based at least in part on the plurality of measurements of the first remote vehicle, wherein the plurality of classification scores includes at least: a plurality of position and speed violation classification scores determined using a first machine learning classifier model, a plurality of mutual interaction violation classification scores determined using a second machine learning classifier model, an anomaly detection score determined using a machine learning anomaly detection model, a plurality of traffic rule violation classification scores determined using a third machine learning classifier model, and a plurality of visual hazard classification scores determined using a fourth machine learning classifier model;
      determine an overall hazard score of the first remote vehicle based at least in part on the plurality of classification scores of the first remote vehicle, wherein the overall hazard score of the first remote vehicle is a weighted exponential moving average of the plurality of position and speed violation classification scores, the plurality of mutual interaction violation classification scores, the anomaly detection score, the plurality of traffic rule violation classification scores, and the plurality of visual hazard classification scores; and perform at least one of the following actions based at least in part on the overall hazard score of the first remote vehicle:
- determine at least one danger zone in an environment surrounding the first remote vehicle and display the at least one danger zone to an occupant of the vehicle using the display;
- notify the occupant of the vehicle about the overall hazard score of the first remote vehicle using the display;
- control the vehicle using an automated routing system to guide the vehicle away from the first remote vehicle in response to determining that the overall hazard score of the first remote vehicle is above a predetermined overall hazard score threshold; and
- transmit the overall hazard score of the first remote vehicle using the vehicle communication system.

19. The system of claim 18, wherein to determine the plurality of classification scores of the first remote vehicle, the controller is further programmed to:
- retrieve information about an environment surrounding the first remote vehicle using the camera,
  - wherein the information about the environment surrounding the first remote vehicle includes at least one of: a plurality of road characteristics, a plurality of road conditions, a location of lane edges, and road sign information.

20. The system of claim 18,
wherein when calculating the weighted exponential moving average, each of the plurality of classification scores is weighted according to relative hazardousness for occupants of the vehicle.

* * * * *